US012222682B2

(12) United States Patent
Gladkov

(10) Patent No.: US 12,222,682 B2
(45) Date of Patent: Feb. 11, 2025

(54) WATCH WITH COMBINATION LOCK PROTECTION

(71) Applicant: Denis Vladimirovich Gladkov, Lisbon (PT)

(72) Inventor: Denis Vladimirovich Gladkov, Lisbon (PT)

(73) Assignee: Denis Vladimirovich Gladkov, Lisbon (PT)

( * ) Notice: Subject to any disclaimer, the term of this patent is extended or adjusted under 35 U.S.C. 154(b) by 440 days.

(21) Appl. No.: 17/769,697

(22) PCT Filed: Oct. 2, 2020

(86) PCT No.: PCT/RU2020/000512
§ 371 (c)(1),
(2) Date: Apr. 15, 2022

(87) PCT Pub. No.: WO2021/211007
PCT Pub. Date: Oct. 21, 2021

(65) Prior Publication Data
US 2022/0382215 A1 Dec. 1, 2022

(30) Foreign Application Priority Data
Apr. 16, 2020 (RU) ........................... RU2020113604

(51) Int. Cl.
*G04B 3/04* (2006.01)
*G04B 37/06* (2006.01)
*G04B 47/00* (2006.01)

(52) U.S. Cl.
CPC ............. *G04B 3/043* (2013.01); *G04B 37/06* (2013.01); *G04B 47/00* (2013.01)

(58) Field of Classification Search
CPC ........ G04B 3/043; G04B 37/06; G04B 47/00; G04B 37/0033; G04B 19/00; B65D 55/145
(Continued)

(56) References Cited

U.S. PATENT DOCUMENTS 5,095,469 A * 3/1992 Leuenberger ............ G04G 5/04 368/76
2009/0073816 A1* 3/2009 Ozawa ................... G04B 39/02 368/300

FOREIGN PATENT DOCUMENTS

CH 702052 B1 * 11/2014 ........... G04B 19/286
CN 105117013 A 12/2015
(Continued)

OTHER PUBLICATIONS

International Search Report and Written Opinion mailed Feb. 24, 2021, directed to International Application No. PCT/RU2020/000512; 8 pages.

*Primary Examiner* — Edwin A. Leon
*Assistant Examiner* — Kevin Andrew Johnston
(74) *Attorney, Agent, or Firm* — BCF LLP

(57) ABSTRACT

The invention relates to watches. According to the invention, the watch comprises a case with a removable cover and a clock mechanism installed in the case, including a setting/winding mechanism. The watch is equipped with a combination lock used to block the setting/winding mechanism and block removing the cover from the case to prevent unauthorized use of the watch. The invention allows increasing the safety of using the watch due to the combination lock installed therein to block the setting/winding mechanism and block removing the cover from the case to prevent unauthorized use of the watch.

32 Claims, 10 Drawing Sheets

(58) Field of Classification Search
USPC .......................................................... 368/278
See application file for complete search history.

(56) References Cited

FOREIGN PATENT DOCUMENTS

| | | | | | |
|---|---|---|---|---|---|
| EP | 2180384 | A1 | * | 4/2010 | ............. G04B 27/00 |
| FR | 2630229 | A1 | | 10/1989 | |

* cited by examiner

WATCH WITH COMBINATION LOCK PROTECTION

CROSS-REFERENCE TO RELATED APPLICATIONS

This application is a U.S. national stage application under 35 U.S.C. § 371 of International Application No. PCT/RU2020/000512, filed Oct. 2, 2020, which claims the priority of RU Application No. 2020113604, filed Apr. 16, 2020, the entire contents of each priority application which is incorporated herein by reference.

FIELD OF THE DISCLOSURE

This invention relates to watches.

BACKGROUND OF THE DISCLOSURE

Nowadays, watch owners, especially owners of expensive mechanical or quartz watches, face the risk of theft for subsequent use or resale, as well as risk of loss.

None of the currently existing mechanical or quartz watches are equipped with mechanical aids to prevent their unauthorized use.

SUMMARY OF THE DISCLOSURE

Thus, the object of the present invention is to create a watch containing a means of preventing its unauthorized use.

In particular, according to the invention, the created watch contains a case with a removable cover and a clock mechanism installed in the case including a setting/winding mechanism, characterized by a combination lock used to block the setting/winding mechanism and block removing the cover from the case to prevent unauthorized use of the watch.

The technical result of the invention consists in reducing the likelihood of the watch theft owing to impossibility of its subsequent use thanks to the installed combination lock blocking the setting/winding mechanism and removal of the cover from the case to prevent unauthorized use of the watch.

Indeed, the combination lock which blocks the setting/winding mechanism and prevents the case cover removal, makes stealing of the watch, as well as its subsequent resale, almost senseless, since it will take the thief a huge amount of time to figure out the code to unblock this combination lock, and remove the watch cover to unlock the setting/winding mechanism. Any attempt to break or open the lock without entering the correct code will damage the watch and lead to the loss of its value.

In addition, the design of the combination lock is quite simple and compact, allowing its easy integration both into already existing watches and watches being prepared for release.

The clock mechanism preferably comprises mechanical or quartz mechanism.

The setting/winding mechanism preferably comprises a spindle with a clock winder (crown).

The combination lock is preferably a dial (twist) lock that provides adequate protection for the watch due to the numerous combinations for unlocking it.

The dial lock is preferably arranged on a separate spindle associated with the setting/winding mechanism.

A gear is preferably mounted on the spindle of the setting/winding mechanism, and the dial lock comprises a lock bolt adapted to block the gear.

The spindle of the setting/winding mechanism preferably has a portion with a square cross-section, and the gear is provided with a corresponding opening for fastening to the said portion of the spindle of the setting/winding mechanism.

The case is preferably rectangular- or square-shaped and the separate spindle is parallel to the setting/winding mechanism spindle.

The case has preferably a round shape and the said separate spindle is arranged at an angle to the spindle of the setting/winding mechanism.

The cover is preferably connected to the case by means of a threaded connection, and the lock bolt of the dial lock has a locking element to block the cover in the closed position of the dial lock. In principle, there was no need to create a locking mechanism of the cover, however, blocking the watch cover further increases the security of the watch, since it will not allow removing it to access the combination lock and unlock the setting/winding mechanism.

Blocking elements corresponding to the locking element are provided on an inner surface of the cover along the perimeter thereof.

The blocking elements corresponding to the locking element are preferably teeth or valleys.

The combination lock comprises at least 3 disks.

The combination lock comprises preferably a roller (coded) lock.

The roller lock is preferably arranged on a side surface of the case in proximity to the spindle of the setting/winding mechanism or on the exterior side of the watch cover.

The roller lock preferably comprises at least 3 disks.

The cover is preferably connected to the case by means of a threaded connection, and the roller lock has a lock bolt to block the cover in the closed position of the roller lock.

The cover is preferably fastened to the case by means of screws.

The cover has preferably a rectangular or square shape and comprises a first end and an opposite second end, wherein a slot for engagement with a corresponding projection of the case is provided on the first end, and a lug for receiving the lock bolt of the combination lock for blocking the cover is provided on the second end.

The cover has preferably a polygonal shape and comprises a first end and an opposite second end, wherein a slot for engagement with a corresponding projection of the case is provided on the first end, and a lug for receiving the lock bolt of the combination lock for blocking the cover is provided on the second end.

The spindle of the setting/winding mechanism is preferably adapted to move along the axis thereof, the dial lock is arranged on the spindle of the setting/winding mechanism, wherein there is provided a U-shaped lock bolt arranged for engagement by a central part thereof with the spindle of the setting/winding mechanism and by legs with guiding elements in a plate of the watch mechanism, substantially parallel to the axis of the spindle of the setting/winding mechanism to move the U-shaped lock bolt along the axis of the spindle of the setting/winding mechanism together with the spindle, wherein the spindle of the setting/winding mechanism is adapted to move along the axis thereof between three positions: (1) the combination lock blocking position in which the lock bolt of the dial lock blocks the U-shaped lock bolt in the absence of engagement between a winding pinion and a sliding pinion and between the sliding pinion and an intermediate wheel; (2) the watch winding position, in which the winding pinion is engaged with the sliding pinion to ensure rotational movement of the spindle of the setting/winding mechanism with the watch winding in the absence of engagement between the sliding pinion and intermediate wheel and in the absence of blocking of the U-shaped lock bolt by the lock bolt of the dial lock; (3) the watch hand shifting position, in which the sliding pinion is engaged with the intermediate wheel to ensure hand shifting of the watch in the absence of engagement between the winding pinion and the sliding pinion and in the absence of blocking of the U-shaped lock bolt by the lock bolt of the dial lock. This embodiment makes it possible to arrange a combination lock on the spindle of the setting/winding mechanism, which, in turn, will make the watch case even more compact.

Unlike the well-known stem-winder bridge, the stem-winder bridge of the clock mechanism, according to the invention, preferably has three grooves on the working surface thereof, corresponding to the said three positions of movement.

The disks of the dial lock are preferably arranged in a plane parallel or perpendicular to the plate. If the disks of the dial lock are arranged in a plane parallel to the plate, the watch case can be made thinner.

In the watch face, a window is preferably provided to display the locked and unlocked positions of the combination lock.

To display the locked and unlocked positions of the combination lock, it preferably comprises an indicator associated with the lock bolt of the dial lock.

The numeric display of the dial lock is preferably located on the clock winder (crown) or on the watch face.

The dial lock numeric display is preferably arranged on the watch face and is associated with the spindle of the setting/winding mechanism by a pair of engaging gears arranged at an angle to each other, wherein one of the gears is mounted on the spindle of the setting/winding mechanism, and another engaging the numeric display of the dial lock.

BRIEF DESCRIPTION OF THE FIGURES

Below, the proposed invention will be described in more detail with reference to the attached drawings, in which.

DETAILED DESCRIPTION OF THE DISCLOSURE

Figure 1:
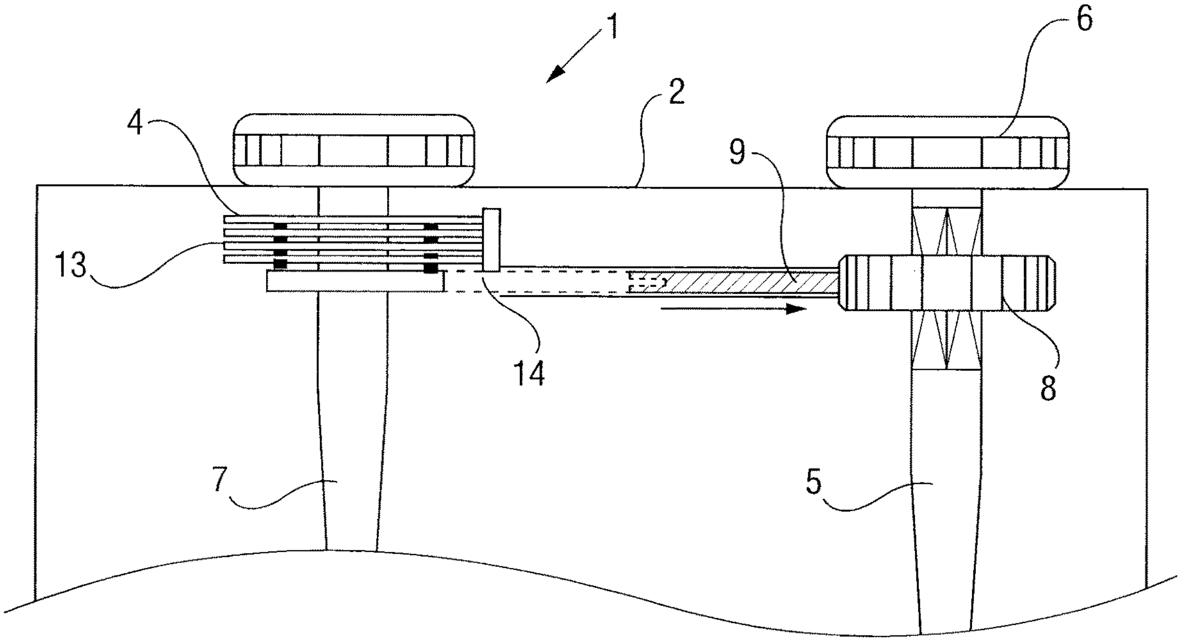
FIG. 1 is a sectional view of the watch with a combination lock arranged on a separate spindle associated with the setting/winding mechanism, in the blocking position.
Figure 2:
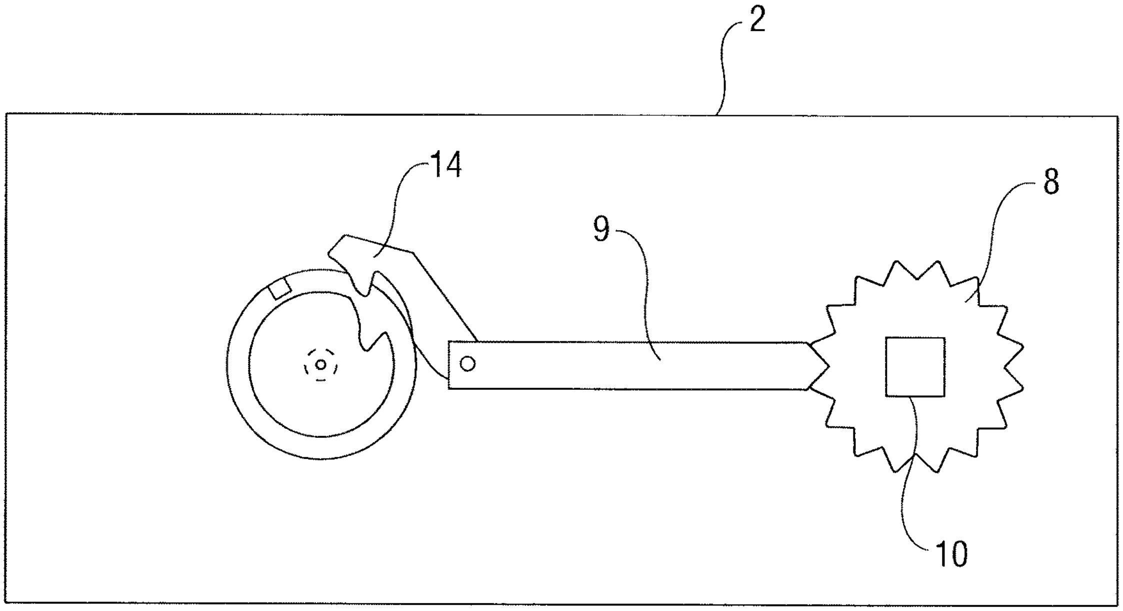
FIG. 2 is a sectional side view of the watch according to FIG. 1 showing the blocking of the combination lock.
Figure 3:
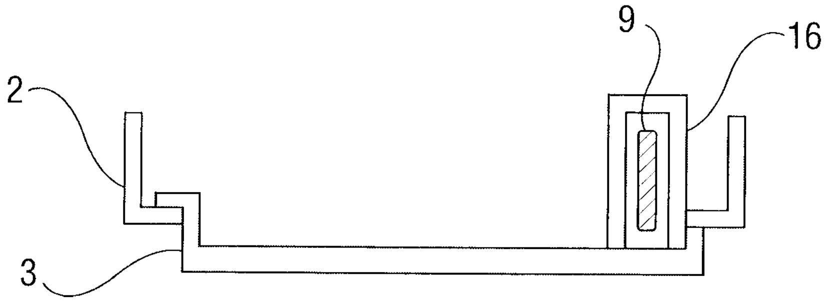
FIG. 3 is a side view of the watch showing the blocking of the watch cover.

According to this invention, the watch with reference number 1, contains case 2 with removable cover 3 and watch face installed in case 2, activating the setting/winding mechanism. The clock mechanism can be both mechanical and quartz. Watch 1 is equipped with a combination lock indicated by reference number 4 used to block the setting/winding mechanism and block removing the cover 3 from the case 2 to prevent unauthorized use of watch 1.

The setting/winding mechanism comprises spindle 5 with clock winder 6 (crown).

In this particular embodiment, combination lock 4 is a dial lock mounted on a separate spindle 7, connected to the setting/winding mechanism by the lock bolt and a gear. For a person skilled in this art, it is clear that the implementation of combination lock 4 in the form of a dial lock is just an isolated occasion, which does not limit the scope of the patent protection of an invention. For example, combination lock 4 can be made in the form of a roller lock (see FIG. 12), a push-button lock, and other numerous devices that are clear and available to a person skilled in the art.

Gear 8 is mounted on spindle 5 of the setting/winding mechanism, and the dial lock comprises lock bolt 9 adapted to block gear 8.

Spindle 5 of the setting/winding mechanism in this embodiment has a portion with a square cross-section, and gear 8 is provided with corresponding opening 10 for fastening to the said portion of spindle 5 of the setting/winding mechanism.

Figure 4A:
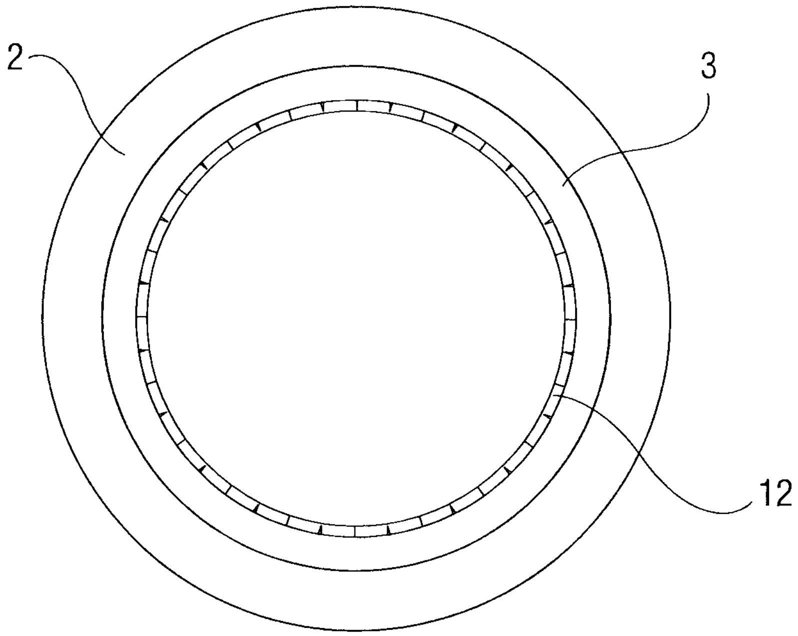
FIG. 4A is a top view of a round screw-on watch cover demonstrating the locking elements arranged thereon.
Figure 4B:
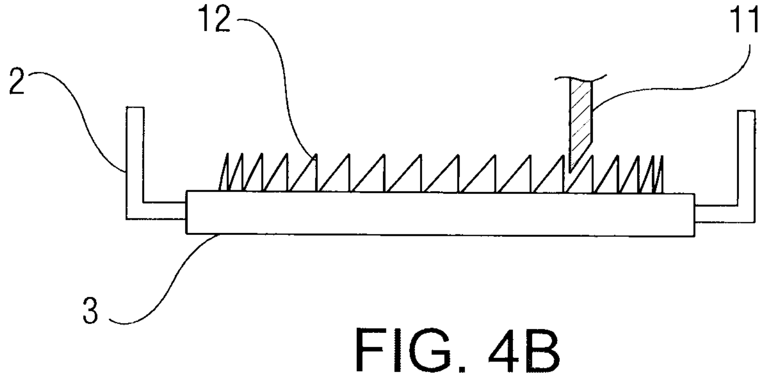
FIG. 4B is a side view of the watch with the cover according to FIG. 4A, showing the blocking of the watch cover.

Case 2 in this embodiment has a rectangular or square shape, and separate spindle 7 is parallel to spindle 5 of the setting/winding mechanism. It is clear to a person skilled in the art that case 2 can have the same round shape (see FIG. 4A). The other embodiment is identical to that with case 2 having a rectangular or square shape, with the exception that said separate spindle 7 shall be arranged at an angle with spindle 5 of the setting/winding mechanism.

Cover 3 is usually connected to case 2 with a threaded connection, with locking element 11 provided to block cover 3 in the closed position of the dial lock.

On the inner surface of cover 3 along the perimeter thereof, there can be blocking elements 12 corresponding to locking element 11, in the form of teeth or valleys.

The dial lock may contain at least 3 disks 13, depending on the implementation scheme and desired burglary resistance of the mechanism. It is clear to a person skilled in the art, that the more disks 13 the combination lock contains, the higher watch 1 security is.

The dial lock itself is a well-known tool and, therefore, this description will not include the code setting and opening.

It should be noted that after the correct dialing and opening of the dial lock due to the fall of the bar (not indicated by a reference number) of lever 14 into the corresponding openings (not indicated by a reference number), lock bolt 9 is released in disks 13 of the dial lock, which, in turn, unlocks gear 8, mounted on spindle 5 of the setting/winding mechanism, and the back cover of the watch, allowing the required operations with watch 1 (winding the watch, adjusting the hands, setting the date, etc.).

Figure 12:
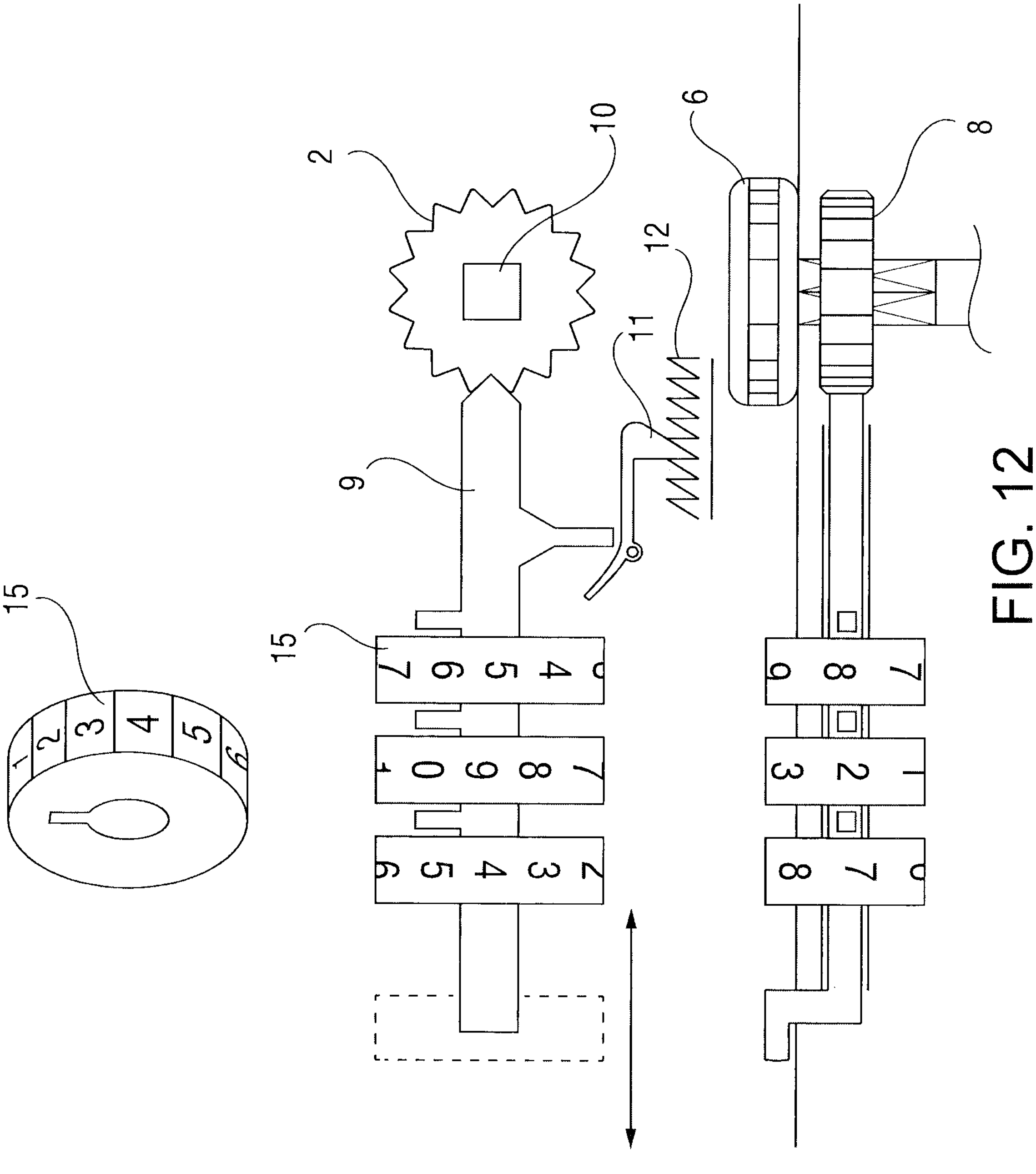
FIG. 12 shows a view of a combination roller lock.

As mentioned above, combination lock 4 according to another embodiment may comprise, for example, a roller lock. This embodiment is shown in FIG. 12.

The roller lock may be arranged on a side surface of case 2 in proximity to spindle 5 of the setting/winding mechanism or on the exterior side of cover 3 of watch 1.

The roller lock comprises at least 3 disks. As with the combination lock, a person skilled in the art, will be aware that the more wheels 15 the roller lock comprises, the higher watch 1 security is.

Cover 3 in this embodiment is connected to case 2 by means of a threaded connection. It is clear, that cover 3 may also be connected to case 2 by means of screws or other suitable fasteners ensuring its fastening on case 2. The roller lock has lock bolt 9 to block cover 3 in the closed roller lock position.

Cover 3, in this embodiment, has a rectangular or square shape. A person skilled in the art understands that cover 3 may have a polygonal shape, for example. Cover 3 has a first end and an opposite second end, wherein a slot for engagement with a corresponding projection of case 2 is provided on the first end, and lug 16 for receiving lock bolt 9 of the combination lock 4 for blocking cover 3 is provided on the second end.

Thus, in its normal operating state, watch 1 is in a position where cover 3 of watch 1 is locked, and the winding of watch 1 or shifting the hands is impossible. To unlock watch 1, the user will need to dial the combination which is known only to him/her on combination lock 4, thus unlocking the setting/winding mechanism, as well as cover 3 of the watch.

According to another embodiment, the combination lock can be located on spindle 5 of the setting/winding mechanism, which is adapted to move along the axis thereof. U-shaped lock bolt 17 is arranged on spindle 5 of the setting/winding mechanism for engagement by a central part thereof with spindle 5 of the setting/winding mechanism and by legs 18 with guiding elements 19 in a plate of the clock mechanism, parallel to the axis of spindle 5 of the setting/winding mechanism to move the U-shaped lock bolt 17 along the axis of spindle 5 of the setting/winding mechanism together with spindle 5.

Figure 5:
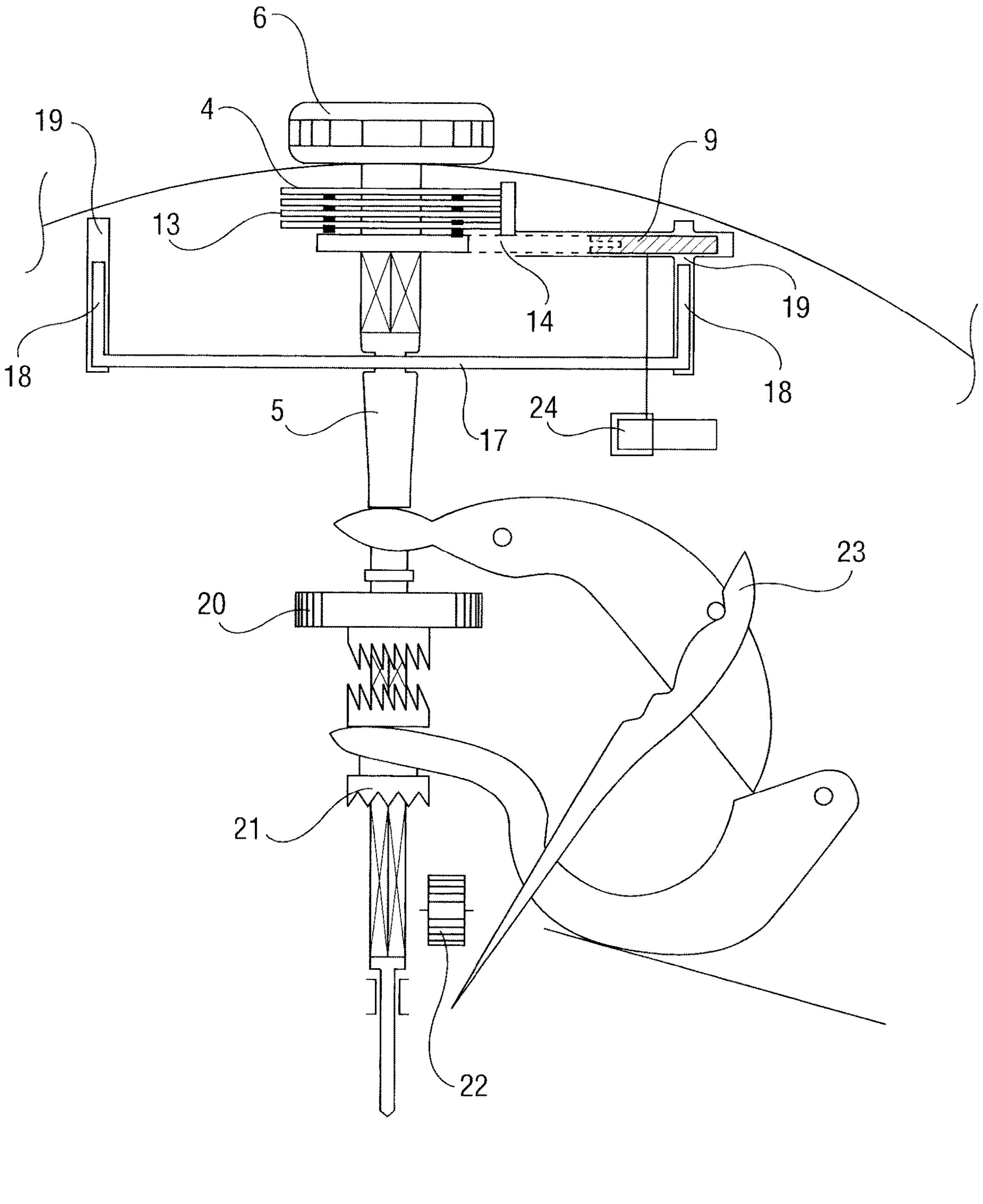
FIG. 5 is a sectional view of the watch with a combination dial lock mounted on a winding/setting stem, in the blocking position.
Figure 6:
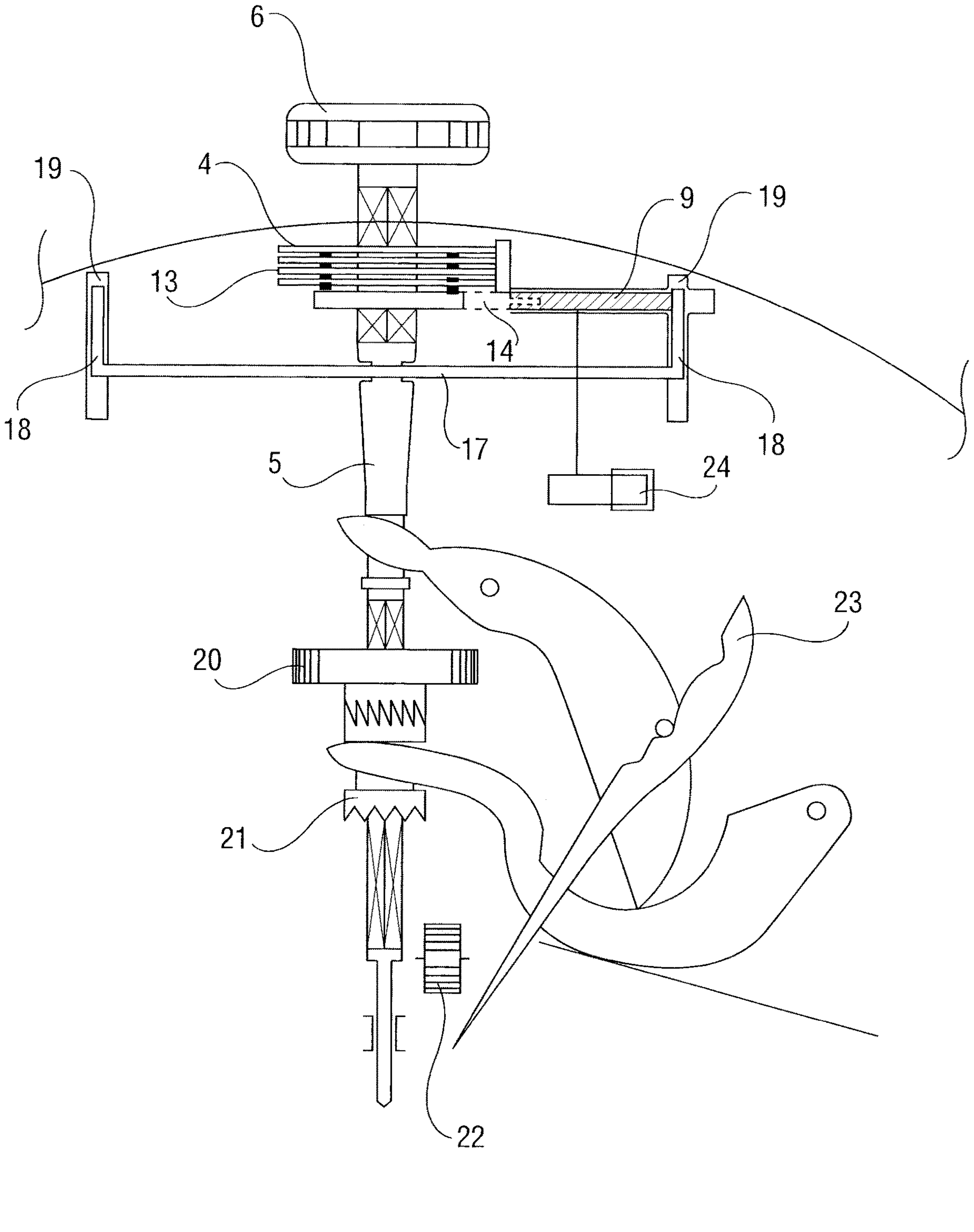
FIG. 6 is a sectional view of the watch with a combination dial lock mounted on a winding/setting spindle, in the watch winding position.
Figure 7:
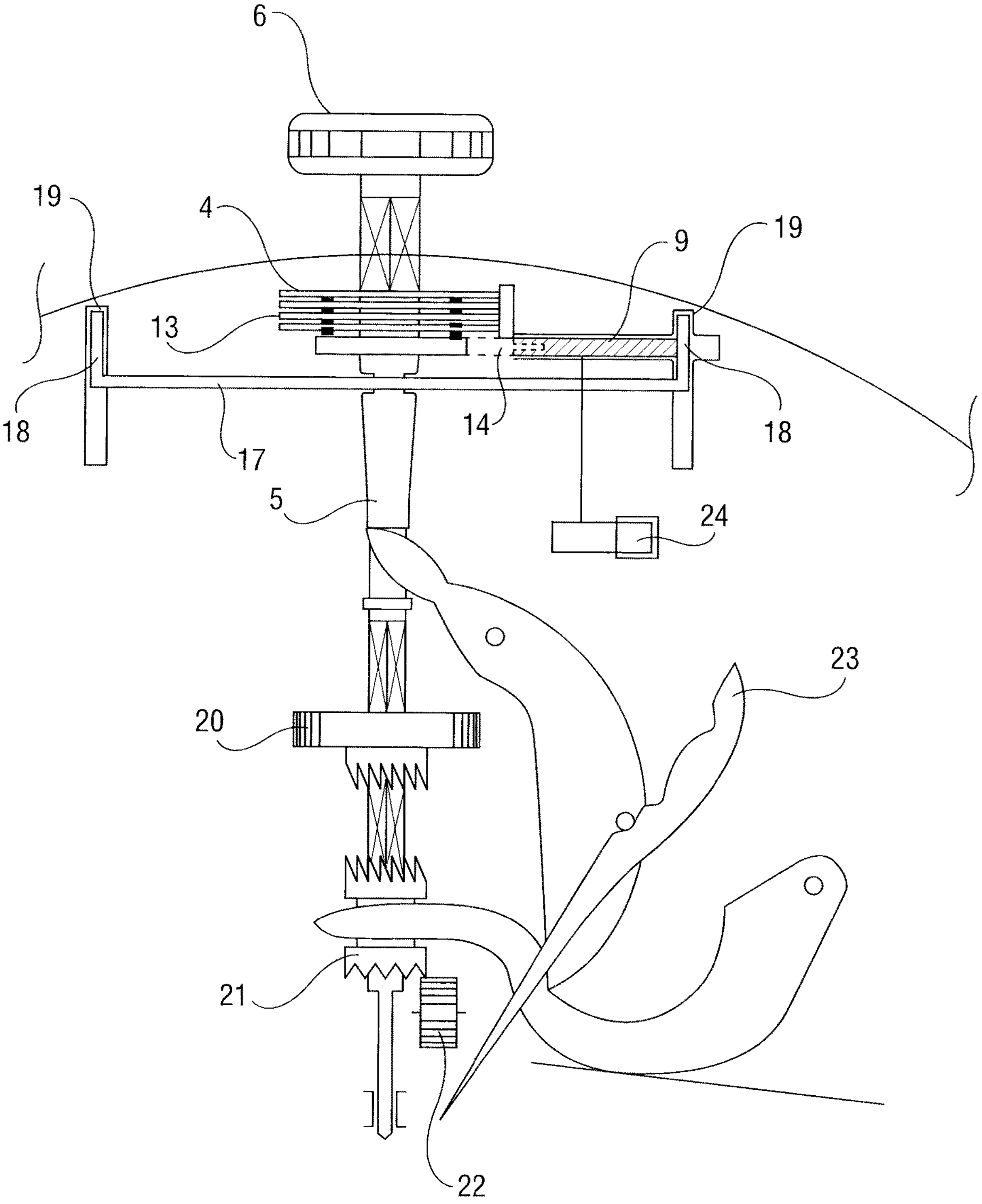
FIG. 7 is a sectional view of the watch with a combination dial lock mounted on a winding/setting stem, in the watch hand shifting position.

Spindle 5 of the setting/winding mechanism is adapted to move along the axis thereof between three positions:

(1) the combination lock blocking position (see FIG. 5) in which lock bolt 9 of the dial lock blocks U-shaped lock bolt 17 in the absence of engagement between winding pinion 20 and sliding pinion 21 and between sliding pinion 21 and intermediate wheel 22;

(2) the watch winding position (see FIG. 6), in which winding pinion 20 is engaged with sliding pinion 21 to ensure rotational movement of spindle 5 of the setting/winding mechanism with watch 1 winding in the absence of engagement between sliding pinion 21 and intermediate wheel 22 and absence of blocking of U-shaped lock bolt 17 by lock bolt 9 of the dial lock;

(3) the watch hand shifting position (see FIG. 7), in which sliding pinion 21 is engaged with intermediate wheel 22 to ensure hand shifting of watch 1 in the absence of engagement between winding pinion 20 and sliding pinion 21 and in the absence of blocking of U-shaped lock bolt 17 by lock bolt 9 of the dial lock.

Stem-winder bridge 23 of the clock mechanism, has three grooves on a working surface thereof, corresponding to the said three positions of movement.

Disks 13 of the dial lock may be arranged in a plane parallel or perpendicular to the plate.

The watch face may be provided with a window to display the locked and unlocked positions of the combination lock.

To display the locked and unlocked positions of the combination lock, it has indicator 24 associated with lock bolt 9 of dial lock 4.

Figure 8:
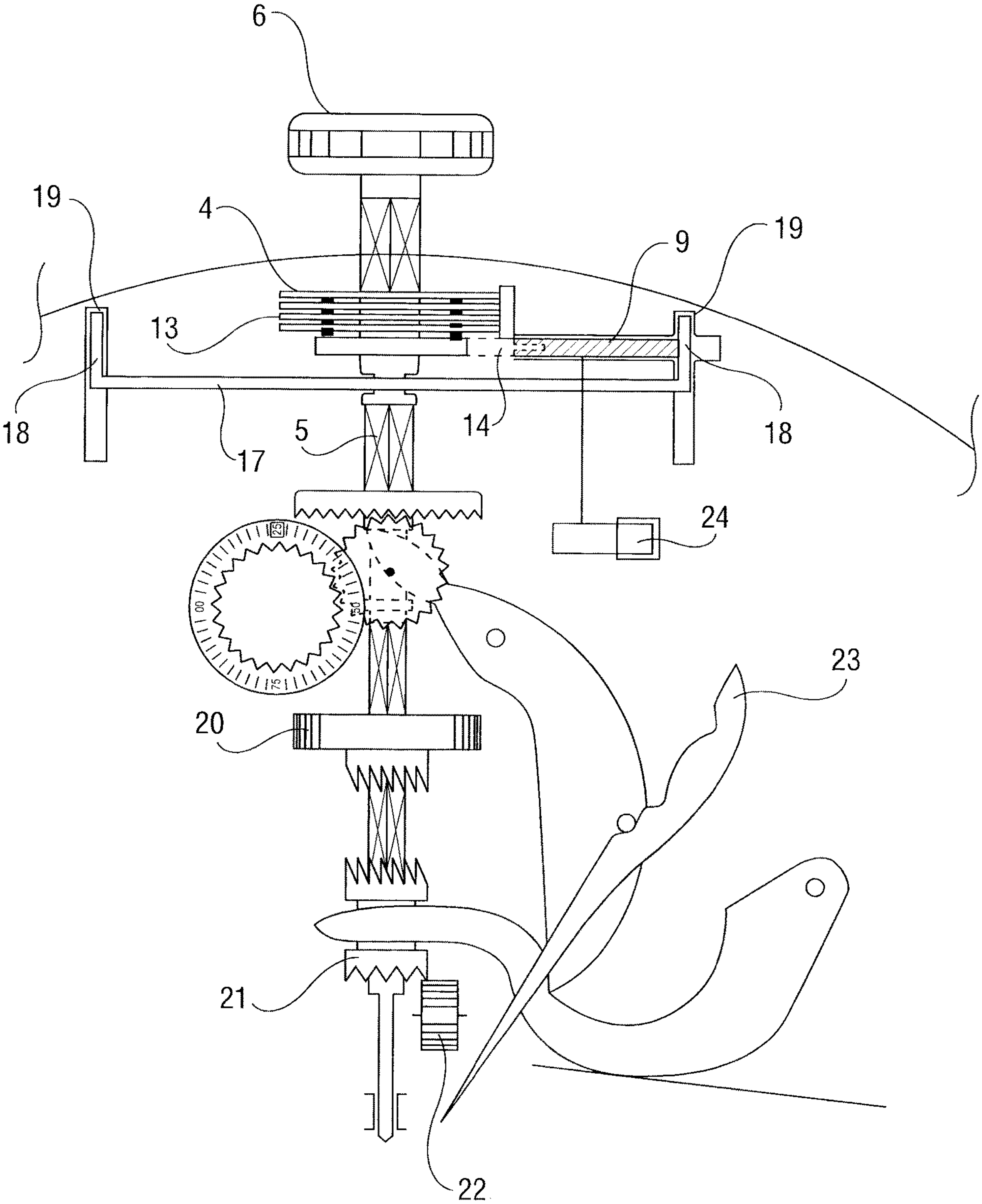
FIG. 8 is a sectional view of the watch with a combination dial lock mounted on a winding/setting stem, and a numeric display arranged on the watch face.
Figure 9:
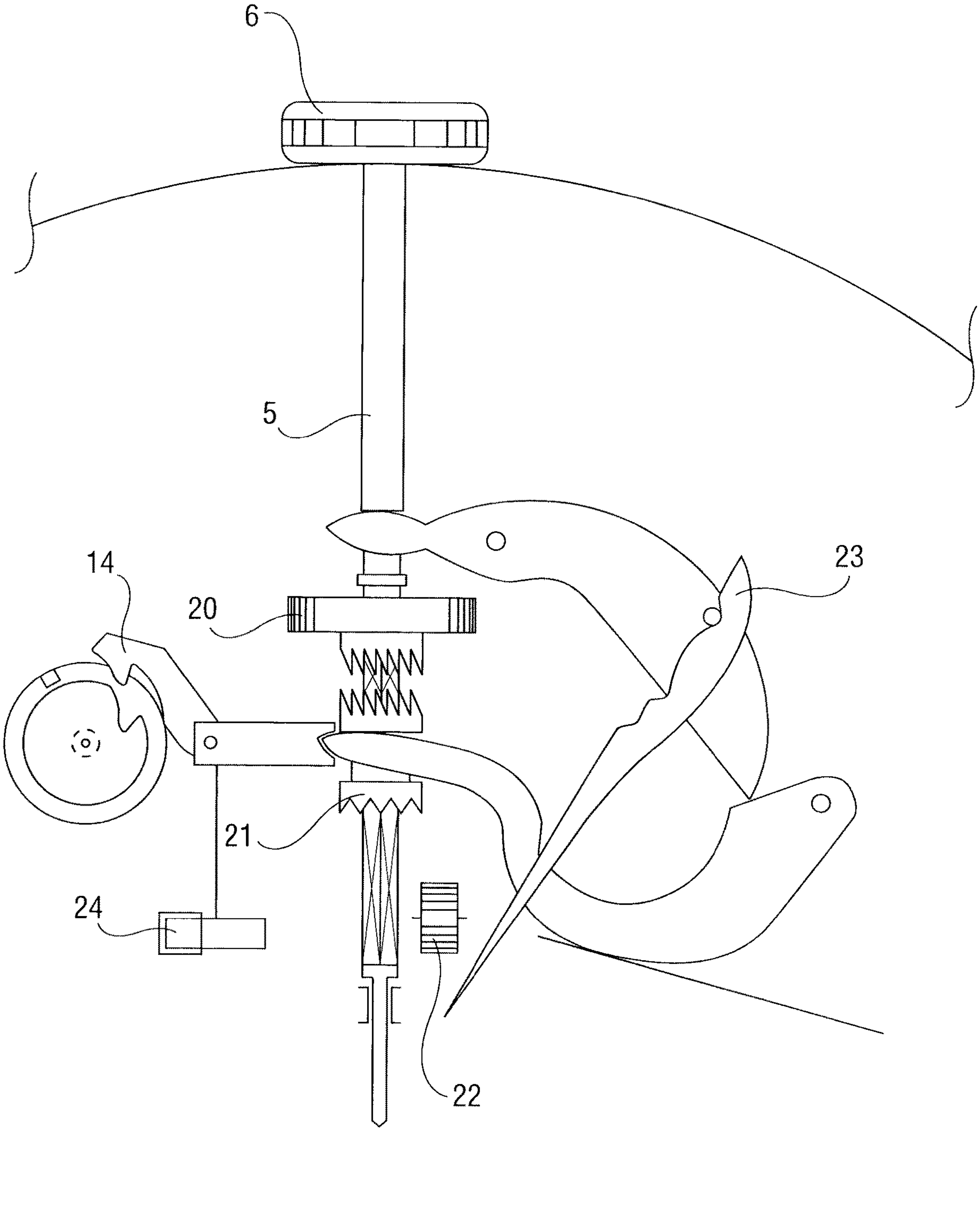
FIG. 9 is a sectional view of the watch with a combination dial lock mounted in parallel in the plate, in the blocking position.
Figure 10:
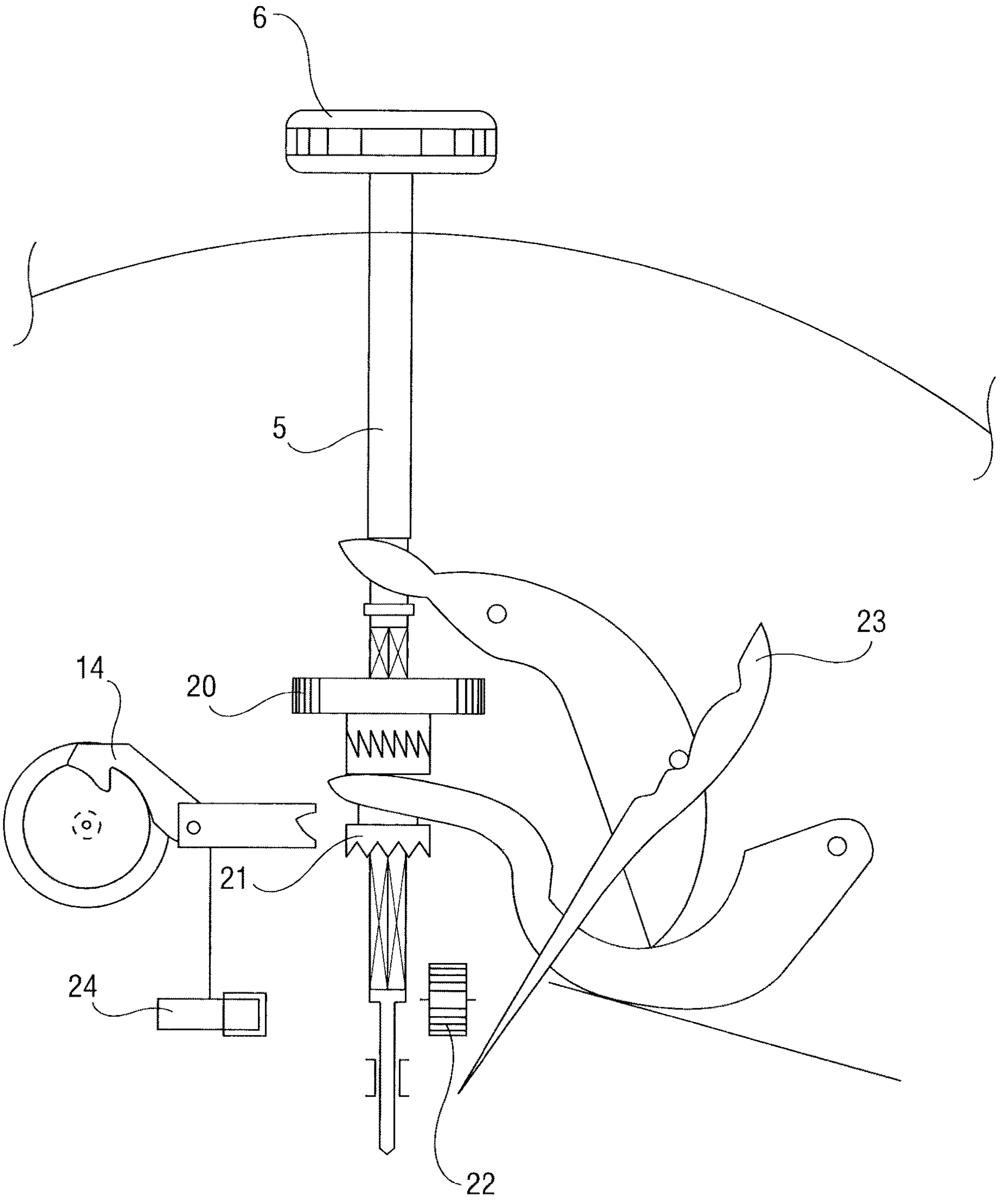
FIG. 10 is a sectional view of the watch with a combination dial lock mounted in parallel in the plate, in the unblocking position.
Figure 11:
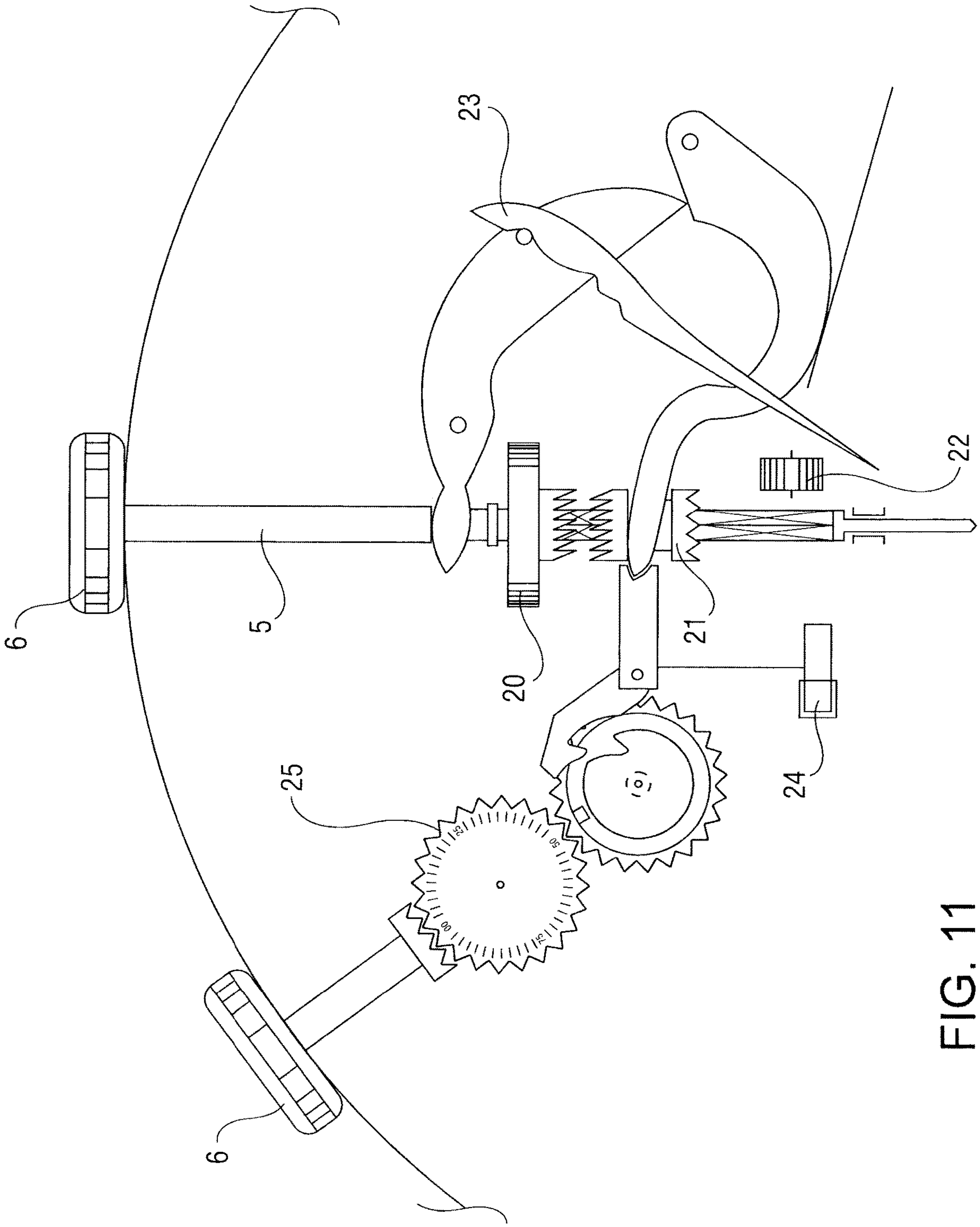
FIG. 11 is a sectional view of the watch with a combination dial lock mounted in parallel in the plate, in the blocking position, and a numeric display arranged on the watch face.

Numeric display 25 of the combination lock is mounted on clock winder 6 (crown) or on the watch face (see FIGS. 8, 11).

Numeric display 25 of the dial lock is arranged on the watch face and associated to spindle 5 of the setting/winding mechanism by a pair of engaging gears located at an angle to each other (see FIG. 11), wherein one of the gears is mounted on spindle 5 of the setting/winding mechanism, and another engaging the numeric display of the dial lock.

The present invention is not limited to the above embodiments and is susceptible to various changes and additions without departing from the concept and scope of the invention, which is defined in the below claims.

The invention claimed is:

1. A watch comprising a case having a removable cover and a clock mechanism installed in the case, including a setting/winding mechanism, wherein the watch comprises a combination lock inside the case of the watch and used to block the setting/winding mechanism and block removing the removable cover from the case to prevent unauthorized use of the watch.

2. The watch of claim 1, wherein the clock mechanism comprises a mechanical or quartz mechanism.

3. The watch of claim 1, wherein the setting/winding mechanism comprises a spindle with a clock winder (crown).

4. The watch of claim 3, wherein the combination lock comprises a dial lock.

5. The watch of claim 1, wherein the combination lock comprises a dial lock.

6. The watch of claim 3, wherein the combination lock is mounted on a second spindle associated with the setting/winding mechanism.

7. The watch of claim 4, wherein a gear is mounted on the spindle of the setting/winding mechanism, and wherein the dial lock comprises a lock bolt adapted to block the gear.

8. The watch of claim 7, wherein the spindle of the setting/winding mechanism has a portion with a substantially square cross-section, and wherein the gear is provided with a corresponding opening for fastening to said portion of the spindle of the setting/winding mechanism.

9. The watch of claim 6, wherein the case has a rectangular or square shape and wherein the second spindle is arranged substantially parallel to the spindle of the setting/winding mechanism.

10. The watch of claim 6, wherein the case has a round shape and wherein the second spindle is arranged at an angle to the spindle of the setting/winding mechanism.

11. The watch of claim 7, wherein the removable cover is connected to the case by means of a threaded connection, and wherein the lock bolt of the dial lock has a locking element to block the cover in a closed position of the dial lock.

12. The watch of claim 11, wherein blocking elements corresponding to the locking element are provided on an inner surface of the removable cover along a perimeter thereof.

13. The watch of claim 12, wherein the blocking elements corresponding to the locking element are teeth or valleys.

14. The watch of claim 1, wherein the dial lock comprises at least 3 disks.

15. The watch of claim 1, wherein the combination lock comprises a roller lock.

16. The watch of claim 15, wherein the roller lock is arranged on a side surface of the case in proximity to a spindle of the setting/winding mechanism or on an exterior side of the removable cover.

17. The watch of claim 15, wherein the roller lock comprises at least 3 disks.

18. The watch of claim 15, wherein the removable cover is connected to the case by means of a threaded connection, and wherein the roller lock has a lock bolt to block the removable cover in a closed position of the roller lock.

19. The watch of claim 1, wherein the removable cover is fastened to the case by means of screws.

20. The watch of claim 7, wherein the removable cover has a rectangular or square shape and comprises a first end and an opposite second end, wherein a slot for engagement with a corresponding projection of the case is provided on the first end, and wherein a lug for receiving the lock bolt of the combination lock for blocking the removable cover is provided on the second end.

21. The watch of claim 7, wherein the removable cover has a polygonal shape and comprises a first end and an opposite second end, wherein a slot for engagement with a corresponding projection of the case is provided on the first end, and wherein a lug for receiving the lock bolt of the combination lock for blocking the removable cover is provided on the second end.

22. The watch of claim 7, wherein the spindle of the setting/winding mechanism is adapted to move along an axis thereof, wherein the dial lock is arranged on the spindle of the setting/winding mechanism, wherein there is provided a U-shaped lock bolt arranged for engagement by a central part thereof with the spindle of the setting/winding mechanism and by legs with guiding elements in a plate of the clock mechanism, substantially parallel to the axis of the spindle of the setting/winding mechanism to move the U-shaped lock bolt along the axis of the spindle of the setting/winding mechanism together with the spindle, and wherein the spindle of the setting/winding mechanism is adapted to move along the axis thereof between three positions:

(1) a combination lock blocking position in which the lock bolt of the dial lock blocks the U-shaped lock bolt in the absence of engagement between a winding pinion and a sliding pinion and between the sliding pinion and an intermediate wheel;

(2) a watch winding position, in which the winding pinion is engaged with the sliding pinion to ensure rotational movement of the spindle of the setting/winding mechanism in the absence of engagement between the sliding pinion and the intermediate wheel and in the absence of blocking of the U-shaped lock bolt by the lock bolt of the dial lock; and (3) a watch hand shifting position, in which the sliding pinion is engaged with the intermediate wheel to ensure hand shifting of the watch in the absence of engagement between the winding pinion and the sliding pinion and in the absence of blocking of the U-shaped lock bolt by the lock bolt of the dial lock.

23. The watch of claim 4 wherein the spindle of the setting/winding mechanism is adapted to move along an axis thereof, wherein the dial lock is arranged on the spindle of the setting/winding mechanism, wherein there is provided a U-shaped lock bolt arranged for engagement by a central part thereof with the spindle of the setting/winding mechanism and by legs with guiding elements in a plate of the clock mechanism, substantially parallel to the axis of the spindle of the setting/winding mechanism to move the U-shaped lock bolt along the axis of the spindle of the setting/winding mechanism together with the spindle, and wherein the spindle of the setting/winding mechanism is adapted to move along the axis thereof between three positions:

(1) a combination lock blocking position in which a lock bolt of the dial lock blocks the U-shaped lock bolt in the absence of engagement between a winding pinion and a sliding pinion and between the sliding pinion and an intermediate wheel;

(2) a watch winding position, in which the winding pinion is engaged with the sliding pinion to ensure rotational movement of the spindle of the setting/winding mechanism in the absence of engagement between the sliding pinion and the intermediate wheel and in the absence of blocking of the U-shaped lock bolt by the lock bolt of the dial lock; and (3) a watch hand shifting position, in which the sliding pinion is engaged with the intermediate wheel to ensure hand shifting of the watch in the absence of engagement between the winding pinion and the sliding pinion and in the absence of blocking of the U-shaped lock bolt by the lock bolt of the dial lock.

24. The watch of claim 22, wherein the setting/winding mechanism includes a stem-winder bridge having three grooves on a working surface thereof, corresponding to the said three positions of movement.

25. The watch of claim 23, wherein the setting/winding mechanism includes a stem-winder bridge having three grooves on a working surface thereof, corresponding to the said three positions of movement.

26. The watch of claim 22, wherein disks of the dial lock are arranged in a plane parallel or perpendicular to the plate.

27. The watch of claim 23, wherein disks of the dial lock are arranged in a plane parallel or perpendicular to the plate.

28. The watch of claim 7, wherein the combination lock comprises an indicator associated with the lock bolt of the dial lock to display the locked and unlocked positions of the combination lock.

29. The watch of claim 4, wherein the clock winder (crown) or a watch face is provided with a numeric display of the dial lock.

30. The watch of claim 29, wherein the numeric display of the dial lock is arranged on the watch face and associated with the spindle of the setting/winding mechanism by a pair of engaging gears arranged at an angle to each other, and wherein one of the engaging gears is mounted on the spindle of the setting/winding mechanism, and another engaging the numeric display of the dial lock.

31. A watch comprising a case having a removable cover and a clock mechanism installed in the case, including a setting/winding mechanism, wherein the watch comprises a combination lock used to block the setting/winding mechanism and block removing the removable cover from the case to prevent unauthorized use of the watch, and wherein the watch comprises a watch face with a window to display locked and unlocked positions of the combination lock.

32. A watch comprising a case having a removable cover and a clock mechanism installed in the case, including a setting/winding mechanism, wherein the watch comprises a dial lock used to block the setting/winding mechanism and block removing the removable cover from the case to prevent unauthorized use of the watch, and wherein a watch face of the watch comprises a numeric display of the dial lock.

* * * * *